United States Patent

Rolfes et al.

[15] 3,651,427
[45] Mar. 21, 1972

[54] OSCILLATOR SYNCHRONIZATION

[72] Inventors: Paul E. Rolfes, Costa Mesa, Calif.; Robert S. Jamieson, Guadalajara, Mexico

[73] Assignee: Lorain Products Corporation, Lorain, Ohio

[22] Filed: Dec. 17, 1969

[21] Appl. No.: 885,898

[52] U.S. Cl. ................................331/153, 331/55, 331/111, 331/153, 307/269
[51] Int. Cl. .........................................H03k 3/08
[58] Field of Search...................331/111, 55, 153, 113, 145, 331/172; 307/64, 65, 66, 269

[56] References Cited

UNITED STATES PATENTS 3,210,691  10/1965  Sprott......................................331/145
3,365,651  1/1968  Rolfes......................................321/43

Primary Examiner—John Kominski
Attorney—Gausewitz, Carr & Rothenberg

[57] ABSTRACT

A relaxation oscillator having a natural frequency substantially the same as the frequency of a source of AC power is synchronized from the power source without the use of any DC connection to or from the oscillator. The natural frequency of the oscillator is momentarily depressed just prior to and during the application of synchronizing pulses to the oscillator from the AC source. The arrangement is particularly useful in a standby power supply system which is synchronized to an AC power line at all times and which continues to supply power after the line fails. The standby power supply includes an inverter that is driven at the AC power source frequency by the synchronized oscillator.

12 Claims, 4 Drawing Figures

INVENTORS.
PAUL E. ROLFES
ROBERT S. JAMIESON

INVENTORS.
PAUL E. ROLFES
ROBERT S. JAMIESON
BY
Gausewitz & Carr
ATTORNEYS.

OSCILLATOR SYNCHRONIZATION

BACKGROUND OF THE INVENTION

1. Field of the Invention

This invention relates to synchronization of oscillators and more particularly concerns a method and apparatus for providing synchronization of an oscillator without any DC connections. It is frequently necessary to synchronize an inverter to another source of AC power such as a second inverter or an AC power line, despite the fact that the inverter to be synchronized has a free running or natural frequency equal to or greater than the frequency of the second power source. Reference is made, for example, to U.S. Pat. No. 3,348,060 to R. S. Jamieson for a Continuously Operating Standby Power Supply and Battery Charging Apparatus and Method. In a standby power supply system such as shown and described in this patent, it may be necessary to synchronize the system to the line while the line is being supplied by a diesel powered generator during extended period of power failure. Such a generator may be characterized by a relatively wide frequency swing, as much as ±3 cycles per second. Therefore, it is necessary to provide an oscillator that may be synchronized from a source that is subject to frequency variations.

2. Description of the Prior Art

An inverter that is driven by a relaxation oscillator, as well known to the art, has generally been synchronized to a frequency higher than the free running frequency of the oscillator and the inverter driven thereby. For this reason, many previous systems have not provided an inverter with a free running frequency equal to the frequency of the AC source from which a synchronizing signal is to be derived. This, of course, is undesirable, since in the event of a power failure, the load originally driven from the AC source will be driven at the lower, natural frequency of the inverter and its driving oscillator.

The problem of insuring that synchronization of the inverter with the AC source will occur and at the same time maintaining the free running frequency of the inverter substantially equal to the synchronized frequency is one that has presented substantial difficulties to workers in the art. This problem was considered and a solution suggested in U.S. Pat. No. 3,365,651 to Paul E. Rolfes for Apparatus and Method for Synchronizing an Inverter to a Source of AC Power.

In the Rolfes patent, a relaxation oscillator for driving the inverter of a standby power supply is provided with a natural frequency that is substantially equal to the line frequency or the frequency of the source of AC power whereby upon failure of the power source the inverter is driven at the natural frequency of the relaxation oscillator and the load sees substantially no change in frequency. However, in order to enable synchronization of the inverter and its driving relaxation oscillator from the AC power source even though the frequencies of the two are substantially the same, and even though within tolerance limits the frequency of the AC power source may drop one or two cycles below the frequency of the oscillator, the Rolfes patent derives a steady DC signal from the AC power source and provides a steady frequency depressing DC signal to the unijunction transistor of the relaxation oscillator. This DC signal maintains the oscillator frequency at a value significantly lower than its natural frequency whereby synchronizing pulses at the frequency of the AC power source may exactly synchronize the oscillator to the source frequency. In this system, upon loss of the power source, the relaxation oscillator goes back to its natural frequency and the standby power supply provides power of the desired frequency. However, the system of the Rolfes patent suffers from several defects. First, if the frequency depressing DC signal were to be lost without loss of the synchronizing signal, the system would be subject to possible loss of synchronization where the AC source frequency is equal to or less than the natural frequency of the oscillator. Alternatively, should the synchronizing signal from the AC source be lost without loss of the DC frequency depress signal then the oscillator frequency is considerably depressed.

Still another problem of the system of the Rolfes patent derives from its requirement of a DC steady state frequency depressing signal. Since it is well known that standby systems must retain their operative capabilities over long periods of time such systems are inordinately subject to drift induced by DC connections. Current leakages through DC connecting devices and in particular diodes, for example, are such as to render stability requirements of this type of circuitry almost impossible to attain. AC connecting devices such as capacitors, on the other hand, are known to be available in considerably higher quality so that such components can be selected with considerably less leakage.

SUMMARY OF THE INVENTION

In the practice of the present invention in accordance with a preferred embodiment thereof, an oscillator is synchronized from a train of synchronizing pulses without any DC connection even though the synchronizing pulses have a repetition rate or frequency substantially equal to the natural frequency of the oscillator. Such synchronization is made possible despite the fact that the synchronizing source may be at a slightly lower frequency than the oscillator natural frequency by momentarily depressing the natural frequency of the oscillator when the synchronizing pulses are applied. The oscillator's natural frequency is depressed for for a time just prior to and during the occurrence of each oscillator synchronizing pulse whereby despite the fact that the synchronizing pulse source may have a frequency slightly less than the natural frequency of the oscillator, synchronization can take place.

DESCRIPTION OF THE PREFERRED EMBODIMENT

Figure 1:
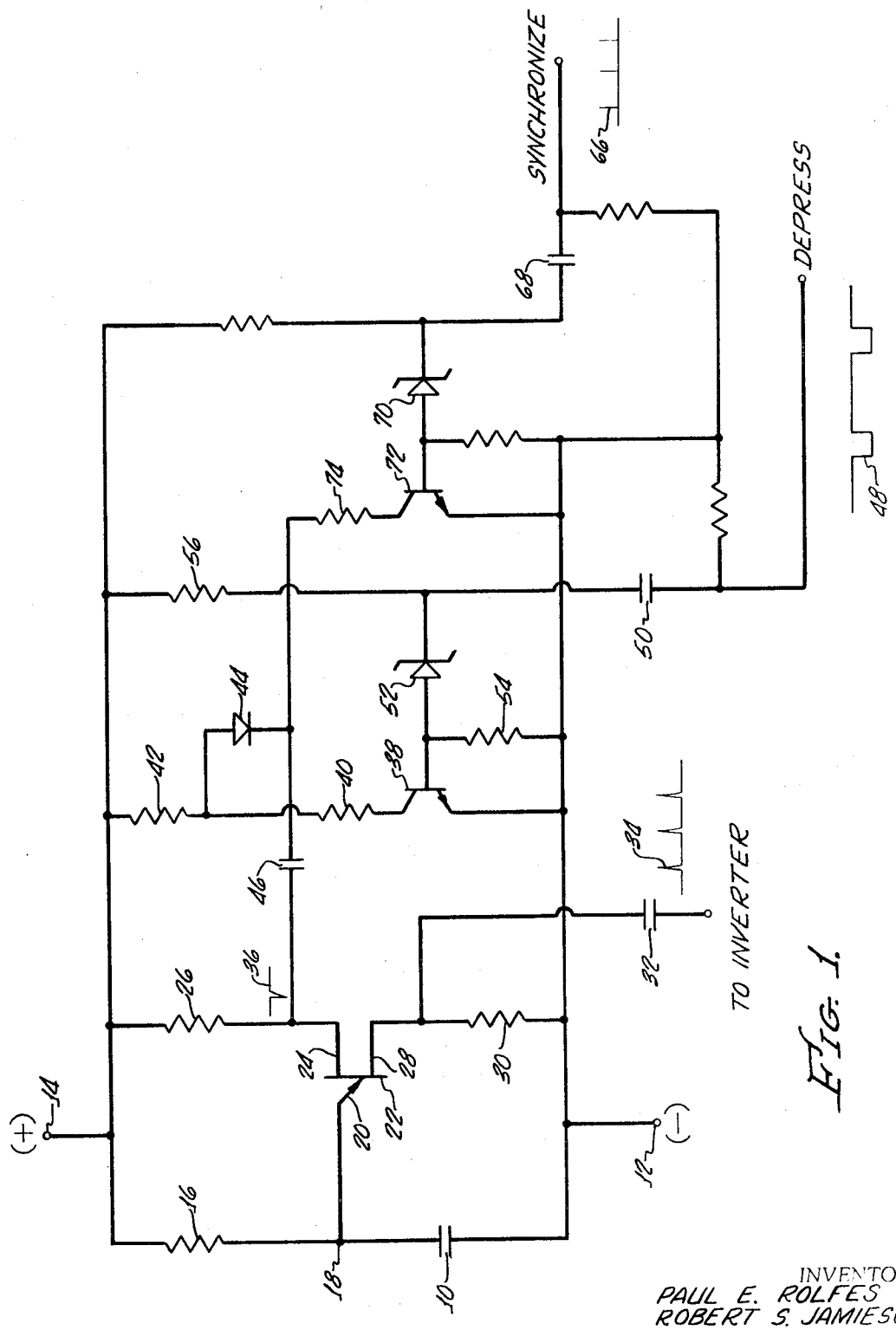
FIG. 1 is a circuit diagram of a synchronized oscillator built according to principles of this invention.

Illustrated in FIG. 1 is a substantially conventional relaxation oscillator comprising a capacitor 10 connected at one side thereof to ground or a source of negative voltage 12 and connected at the other side thereof to a source of positive voltage 14 through a charging resistor 16. The junction 18 between the capacitor 10 and resistor 16 is connected to the emitter electrode 20 of a unijunction transistor 22 having a base-two electrode 24 connected to the positive supply through a resistor 26 and having a base-one electrode 28 connected to the negative supply via a resistor 30.

Many different types and arrangements of relaxation oscillators and other oscillators are well known and a number of these may be employed in a practice of the present invention. However, the circuit illustrated is preferred for convenience of application of the synchronizing and depressing signals as more particularly described below.

The output of the oscillator, taken at the base-one electrode 28, is fed via an output capacitor 32 to effect synchronization of an inverter (not shown in this figure). The oscillator output that is fed to the inverter comprises the series of sharp synchronizing or triggering pulses 34.

Since, as previously described, the preferred embodiment of this invention is specifically adapted for use with a standby inverter power supply, it may be assumed that the natural frequency of the oscillator is desirably 60 Hz., having a period of 8.33 milliseconds. Therefore, as is well known, values of resistor 16 and capacitor 10 are selected to provide a free-running or natural period of oscillation of 8.33 milliseconds. Resistors 26 and 30 in this oscillator are selected for stability of operation of the unijunction transistor. Although the output of the oscillator may be taken at a number of different points, for the purposes of this discussion, it is assumed that the output is taken as indicated at the base-one electrode 28, the junction of transistor 22 and resistor 30. The output at this point is the positive going pulse train 34 at a repetition rate of 8.33 milliseconds in this expository embodiment. The inverter, when driven by this pulse train has the desired frequency of 60 Hz.

As mentioned above, in order to avoid DC leakage of currents and to obtain maximum stability of oscillation, it is desirable to avoid DC or direct connections to the oscillator. Since the output is in the form of positive going pulses, the output may be capacitively coupled to the next stage and to the inverter, thus requiring no DC or direct connections to the oscillator by means of its output.

In the following discussion, it will be shown that such a stable oscillator, having no DC connections can be used to drive a power inverter and can be synchronized to a frequency source that is of the same frequency or nearly the same frequency or of a somewhat lower frequency than the oscillator natural frequency. If the oscillator is exactly the same frequency as the source to which it is to be synchronized but is out of phase with the source, it is impossible to ever achieve synchronization. Further, if the oscillator is operating at a frequency incrementally higher than the synchronizing source frequency, it would be impossible to synchronize to the source frequency with the circuitry described to this point because, with this type of oscillator the only method of synchronization that can be employed is that which increases its natural operating frequency. Such a synchronization can be introduced at a number of points in the oscillator circuitry illustrated in FIG. 1. However, for purposes of this discussion, it will be considered that synchronization will be performed by the introduction of a negative going pulse 36 at the junction of resistor 26 and transistor 22. As is well known with a unijunction transistor, the point at which the transistor fires, that is, conducts through its emitter to electrode 28, is determined by the relation of the voltage level on the emitter electrode and the voltage on one or both of the base electrodes. For example, with the voltage on the electrode 28 held at fixed level, the voltage required on the emitter electrode 20 to cause the normally nonconducting transistor to conduct increases with increases in the voltage level on the electrode 24. Conversely, as the voltage on electrode 24 is decreased, the voltage on the emitter electrode 20 that is required to fire the transistor concomitantly decreases. Accordingly, it will be seen that the magnitude of the negative going synch pulse 36 that is introduced at the junction of resistor 26 and the transistor will determine the amount that the oscillator frequency can be increased by the synchronizing pulse. By proper selection of amplitude of this synchronizing pulse, it can be arranged that the oscillator frequency will be increased to the desired amount and no more. Thus the amplitude of the synchronizing pulse is chosen so that the maximum increase in frequency that may be caused by this pulse does not exceed selected oscillator frequency tolerances.

Assume for purposes of this description that the inverter (to be driven by the illustrated relaxation oscillator) frequency must never exceed a tolerance of ±1 percent. In order to achieve this goal, it will be assumed that the oscillator is stabilized to one-tenth of 1 percent and the AC source has a stability of ±1 percent. For such a situation, the synch pulse amplitude would be so selected as to cause a maximum increase of the frequency of the natural oscillator frequency of 1 percent. If the AC source frequency, which is preferably the same as the frequency of synch pulses 36, is higher than the natural frequency of the oscillator there is no difficulty in synchronizing the oscillator by feeding these negative going synchronizing pulses as indicated. The oscillator natural frequency will then be lower than the synchronizing frequency and the natural frequency can thus be momentarily increased by application of the synchronizing pulse. If, however, the source frequency (the frequency of synchronizing pulses 36) is lower than the natural frequency of the oscillator, it will be readily understood that the oscillator will have completed one full cycle, that is, the unijunction 22 will have fired, before the synch pulse occurs; and therefore, the synch pulses 36 will have no effect.

For such a condition, where the source or synch frequency is lower than the natural frequency of the oscillator, it is necessary to decrease the frequency of the oscillator in such a manner as to avoid exceeding the tolerance limits of ±1 percent of the natural frequency under any circumstance.

The oscillator frequency can be decreased by increasing the voltage at the junction of resistor 26 and the transistor 22. Therefore, if this point is raised in voltage for a very short duration of time, for a time immediately prior to the application of the synch pulse 36, it is possible to synchronize the oscillator to a frequency that is lower than its natural frequency. Furthermore, having the requirement only to decrease or depress the oscillator natural frequency for a relatively short period of time, there is no need for DC connections and the frequency depressing circuitry can be AC coupled to the oscillator.

Frequency depressing is provided by a circuit including an NPN transistor 38 having its emitter connected to the negative supply voltage and having its collector connected by a resistive voltage divider comprising resistors 40 and 42 to the positive supply. To the junction of the resistors 40 and 42, there is connected the anode of a diode 44 which has its cathode connected via a capacitor 46 to the junction of resistor 26 and transistor 22. A train of negative going substantially square wave frequency depressing pulses 48 is coupled to the base of transistor 38 through a coupling capacitor 50, a Zener diode 52, and across a resistor 54 that is connected between the negative source of potential and the junction of the base of the transistor 38 with the anode of Zener diode 52. A resistor 56, connected between the Zener diode cathode and the positive supply provides bias for the circuit.

As illustrated in FIG. 1, the transistor 38 is normally held in the on position, that is, conducting heavily by the relatively high level of voltage provided via resistor 56 from the positive voltage source. In this manner, the cathode of the Zener diode 52 is held at a relatively high potential whereby the transistor 38 will conduct. Conduction of the transistor 38 provides a relatively low potential on the anode of diode 44 with respect to its cathode whereby this diode is cut off. Upon occurrence of a depress pulse 48, a negative going signal is fed across the capacitor 50 to the cathode of diode 52 and to provide a negative going signal to the base of transistor 38 which is thereby cut off. As transistor 38 is cut off, the voltage at the anode of diode 44 rises to provide through the diode and through capacitor 46 a sharp, positive going signal at the junction of resistor 26 and transistor 22. This condition terminates when the depress signal voltage again goes high to cause the cathode of diode 52 to again be raised and to cause transistor 38 to again conduct.

Figure 2:
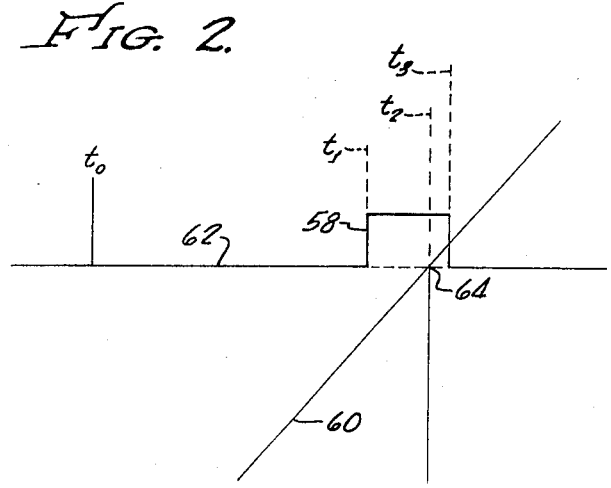
FIG. 2 illustrates certain timing and wave forms of the synchronization and frequency depressing method of this invention.

For consideration of the effect of the depress pulses 48 upon the frequency of the relaxation oscillator, reference is made to the graph of FIG. 2. In a normal sequence of operations starting from a time $t_0$, the oscillator providing the desired 60 cycle synchronization of an inverter will have a natural period of 8.33 milliseconds. However, if at a time of 8 milliseconds after time $t_0$, at a time indicated at $t_1$ in FIG. 2, the voltage at the depress point is lowered, the frequency of the oscillator is shifted downward. If at subsequent time $t_3$ that occurs at the end of an additional 0.41 milliseconds, a total of 8.41 milliseconds from $t_0$, the voltage at the depress pulse is allowed to again go high, the oscillator will again return to its normal free-running mode. In FIG. 2, the pulse 58 that occurs in the time interval between $t_1$ and $t_3$ represents the increase of voltage at the junction of resistor 26 and transistor 22 in FIG. 1 and the line 60 represents an idealistically linear charging voltage on the capacitor 10 which is, of course, the voltage at the emitter 20 of the unijunction transistor 22. Considering the voltage level indicated at 62 in FIG. 2 to be the voltage normally provided at electrode 24 of the transistor, it is assumed that the transistor will normally fire at time $t_2$, the point at which the voltage 60 on the transistor emitter reaches a point where it is "equal" to the voltage level 62. It will be understood that the equality or coincidence between the voltage level 64 on the transistor emitter and the voltage level 62 on the transistor electrode 24 is not a necessary concomitant of operation of this transistor since the transistor operates not upon equality of these voltages necessarily, but upon the occurrence of a predetermined relation therebetween.

It will be seen that if at time $t_1$ the voltage on the electrode 24 is raised, as by the occurrence of the pulse 58, the transistor will not fire at time $t_2$, but rather the voltage of the emitter electrode will continue to rise. If now, at time $t_3$, the pulse 58 terminates and the depress signal is removed, electrode 24 immediately returns to its normal voltage state, and the oscillator would immediately fire at such time $t_3$. If the pulse width from $t_1$ to $t_3$ is so chosen and the time of initiation of such pulse $t_1$ is chosen such that the time $t_3$ occurs at 8.41 milliseconds after the initiation of the oscillator cycle, it will be seen that the use of this depress control circuitry cannot possibly depress the oscillator frequency beyond the 1 percent frequency tolerance. In other words in order to retain operation within a preselected tolerance, it is necessary only to initiate the depress at a time $t_1$ sufficiently early to prevent triggering by a synch pulse that has been increased in frequency within the tolerance limits of the synchronization source and then to insure termination of the depress pulse at a time after occurrence of the termination of the natural oscillator period that is not greater than the maximum tolerable decrease of oscillator frequency. In other words, if synch pulses are absent, the oscillator will still fire at $t_3$, the termination of the depress pulse, and will still remain within tolerance limits.

Having described the method of depressing the oscillator frequency, the method and apparatus for synchronization of the oscillator to the frequency of the AC source which in this example also has a half period of 8.3 milliseconds will now be described.

Starting at time $t_0$ as indicated in FIG. 2, capacitor 10 begins to charge and the oscillator period begins. The oscillator would normally fire at $t_2$, 8.33 milliseconds after $t_0$, but the depress signal is introduced at $t_1$, 8.00 milliseconds after $t_0$, and thus prevents the oscillator from firing. The synch signal comprising a number of positive going pulses 66, FIG. 1, is provided via a coupling capacitor 68 to the cathode of a Zener diode 70 and thence to the base of an NPN transistor 72. The latter is biased to be normally in the nonconducting condition whereby the positive going synch pulses applied to its base cause the transistor to conduct through resistor 42, diode 44, and resistor 74 whereupon a negative going pulse 36 is transferred through the capacitor 46 to the junction of resistor 26 and transistor electrode 24. The momentary reduction in the voltage on electrode 24 of transistor 22 has the effect of increasing the natural frequency of the oscillator and causes it to fire at that exact time.

Referring to FIG. 2, the synch pulses 66 are caused to occur at time $t_2$, a time which occurs 8.33 milliseconds following time $t_0$, in the illustrated example of this embodiment.

By the methods and apparatus illustrated in FIGS. 1 and 2, it will be seen that an oscillator of a precise natural frequency can be synchronized to an AC source of a substantially similar frequency without any direct coupling of any signals into or out of the oscillator. All signals are coupled through capacitors thereby allowing for maximum oscillator stability and minimizing the possibility of DC leakage current and concomitant drift.

Figure 4:
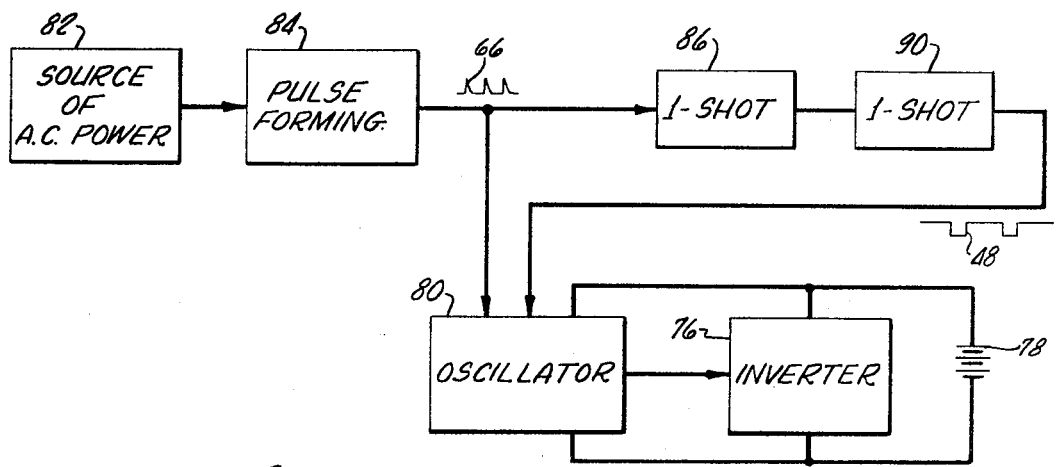
FIG. 4 is a block diagram of an inverter power supply system employing the synchronized oscillator of the present invention.

Illustrated in FIG. 4 is a standby power supply system employing the frequency synchronized oscillator described above. Also illustrated in this figure are the requirements and arrangement for providing the synchronizing and frequency depressing pulse trains. An inverter 76 which may be of the type illustrated in the aforementioned U.S. Pat. to Jamieson, No. 3,348,060, comprising a parallel square wave SCR inverter of the type described on page 152 et seq. of the General Electric SCR Manual, Second Edition, is provided with a DC power supply 78 that also provides the power to an oscillator 80 of the type illustrated in FIG. 1. The source of AC power 82 is provided to supply power to a load (not shown) and also to the inverter 76. Power may be supplied from the source of AC power to the inverter by means more particularly described in the aforesaid Jamieson U.S. Pat. No. 3,348,060. In such a system during normal operations, the AC line is feeding the power to a battery charger (not shown) which converts the power to DC and supplies such DC power to the inverter and also to the battery 78 if it should need recharging. In such a system, the inverter system converts this DC power back into AC power and feeds the load. Thus during normal operation, the power from the AC utility line is being continually converted to DC by a charger and reconverted to AC by the inverter before it is fed to the load. In the event of an AC input power failure, the charger or rectifier simply ceases to function and the inverter receives its input power from its battery. During such utility line outages, as long as the battery voltage remains above a certain preset limit, the inverter will continue to supply AC power to the load without interruption.

Figure 3:
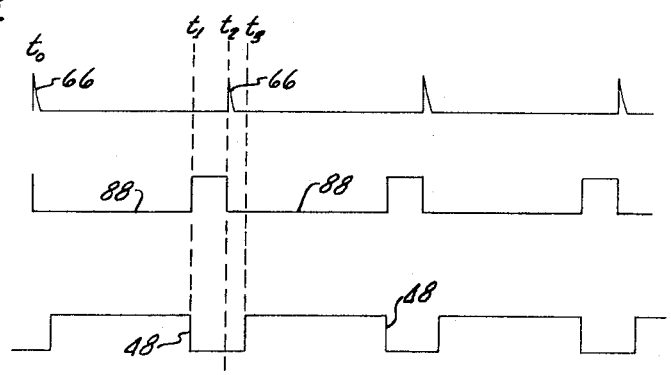
FIG. 3 is a synchrograph showing relative timing of various wave forms of the system.

In FIG. 4 only so much of the above described system is shown as will provide the necessary frequency synchronization of the oscillator 80 that triggers inverter 76. A pulse forming circuit 84 of a conventional type such as for example, one of the SCR trigger circuits shown on pages 329 and 330 of the General Electric Transistor Manual, published 1964 by General Electric Company, detects zero crossover points of the AC signal from the power source 82 and generates a train of pulses 66 that are synchronized from the AC line. These pulses are fed to the oscillator 80 as more particularly illustrated in connection with FIG. 1. These synchronizing pulses also identify the start time $t_0$ for each cycle of the oscillator. In addition to synchronizing the oscillator, the synch pulses 66 initiate operation of a first monostable multivibrator or one-shot 86 which is set to provide a pulse 88 that defines a time period of 8.00 milliseconds, from time $t_0$ to time $t_1$ as illustrated in FIG. 3. At $t_1$, the end of the period of the one-shot 86, its negative output rises to thereupon trigger a second monostable multivibrator or one-shot 90 which provides the negative going depress pulses 48. The period of this second one-shot 90, which is initiated at time $t_1$ and terminates at $t_3$, is exactly 0.41 milliseconds for the described example. Thus synch pulses 66, generated at intervals of 8.33 milliseconds, trigger one-shot 86 which has an output that lasts for 8.00 milliseconds and thereupon in turn triggers one-shot 90 having a duration of 0.41 milliseconds. From the previous discussion it will be seen that the times of 8.00 milliseconds and 0.41 milliseconds for the delay periods of the one-shots 86 and 90 are selected to maintain a total frequency shift of not more than 1 percent of the predetermined 8.33 millisecond natural period of the oscillator. Since the synch pulses 66 occur during the existence of the negative going depress pulse 48 from the second one-shot 90 the relaxation oscillator is able to be triggered exactly at the time of occurrence of such synch pulses. Therefore, the oscillator operates with a time period of exactly 8.33 milliseconds and is precisely synchronized with the frequency source.

Specific circuitry of the monostable multivibrators is not described since many common forms of such one-shot circuits are available and may be employed in the practice of this invention. Although multivibrators are shown and conveniently employed for timing purposes, it will be readily appreciated that extreme precision methods for determination of this timing and similar wave shapes may employ various well-known digital methods of counting down from high frequency standard crystal clocks.

From the above description, it will be seen that there has been provided an effective method and apparatus for synchronizing a power inverter of precise frequency from a power source of a similar frequency. This has been accomplished while maintaining a frequency stability that does not depart by more than 1 percent from its normal operating frequency, which has been assumed for the purposes of this discussion to be 60 Hz.

Operation of the described circuit under different conditions of failure will now be described assuming the system to be employed in a commercial power line and there occurs a failure of a source of AC power. For a failure of the frequency source, a commercial power failure, pulses formed by the pulse forming circuits 84 would immediately cease to exist since there is no AC input to generate these pulses. Therefore, the synch pulses to the oscillator disappear and the oscillator now operates in its unsynchronized mode. Monostable multivibrator or one shot 86, however, will have already been set by the previous synchronization pulse, that pulse being the last pulse that occurred prior to the power failure, and would be in the process of timing out its 8 millisecond period. At the end of this time, it triggers the second one shot 90 which momentarily depresses the oscillator frequency for an additional period of 0.41 milliseconds. Therefore, since the synch pulse no longer exists, the oscillator will not be fired by the synch pulse and will fire in this situation only at the end of the additional 0.41 millisecond delay of the second one shot 90. This causes the first oscillator cycle that occurs after line failure to be extended in time to a total time of 8.41 milliseconds rather than the normal 8.33 milliseconds and provides for an increase of the period of 1 percent. It can be seen then, that by selection of time in the monostable multivibrator or by proper selection of wave shapes as derived from a clock or other means of selection of the depress pulse widths, it is possible to achieve a system that will never exceed the stated frequency tolerance by decreasing its natural frequency by more than 1 percent. It is noted that the natural frequency cannot be increased in the case of failure of the power source since the oscillator will then continue to operate at its natural frequency.

In the event of failure of the synch pulses, that is if they are not available to the oscillator, the first cycle of the oscillator again would be the extended period of 8.41 milliseconds, the same as would occur with a failure of the frequency source. However, since the failure would occur only in the synchronizing signal itself, in this particular example, the pulse forming circuits would still be triggering the one shot 86 and, in turn, the one shot 90. The oscillator in such a situation would continue to operate with a period of 8.33 milliseconds after the first cycle since the start time of each cycle is now coincident with the termination of the depress pulse 48 and the period between the trailing edge of succeeding ones of these depress pulses is still 8.33 milliseconds. This would result in a continuation of the inverter operation essentially in synchronization with the source of AC power. There would, however, in this situation occur a slight phase displacement of 0.08 milliseconds due to the extension of the first cycle after loss of synchronization pulse.

Consider now the operation of the circuit that would take place with failure of one of the one-shot multivibrators. The oscillator, in such an occurrence, would return to its normal free-running mode since the signals from the second one-shot monostable multivibrator 90 are capacitively coupled to the oscillator after the first operation of this one-shot. If the latter should fail to operate regardless of which one of its states the failure occurred in, the oscillator continues to operate in its normal manner since there is no DC connection from the one shot to the oscillator. The effect is merely to lose the frequency depress signal. Therefore, if the oscillator happens to be operating in a frequency that is slightly faster than the AC source, the oscillator would merely continue on in its free-running mode. If the oscillator happened to be operating at a frequency that was slightly lower than the AC source with a failure of the one shots, the oscillator would continue to operate in synchronization since it would still receive the synchronizing pulses 66 from the pulse forming circuit 84. In either case, however, the oscillator change, if any, would not exceed the total frequency tolerance previously determined to be ±1 percent.

There has been described a system for a standby power supply employing an improved method and apparatus for oscillator synchronization which enables the oscillator and inverter of the power supply to operate with a natural frequency substantially equal to or somewhat greater than the main source of AC power and nevertheless, be synchronized therewith, all without employing any DC connections to the oscillator. Thus a system of greatly improved stability has been described.

We claim:

1. A method of synchronizing an oscillator having a natural frequency from a signal source of substantially similar frequency comprising the steps of
    generating synchronizing pulses from said source, applying said pulses to synchronize the oscillator, and
    momentarily depressing the natural frequency of the oscillator when the synchronizing pulses are applied, said last mentioned step comprises the step of applying frequency depressing pulses to the oscillator.

2. The method of claim 1 wherein each said depressing pulse terminates after a time interval following a synchronizing pulse that is substantially equal to the maximum increase of period of the oscillator that is within a predetermined allowable tolerance,
    whereby the oscillator frequency will be maintained within said tolerance even in the absence of said synchronizing pulses.

3. In combination
    an oscillator,
    means for applying a train of synchronizing pulses to the oscillator, and
    means for momentarily depressing the oscillator frequency just prior to and during each synchronizing pulse, said last mentioned means comprising
    means for capacitively coupling to the oscillator a train of frequency depressing pulses,
        each said depressing pulse being initiated at a time immediately preceding each synchronizing pulse that comprises a minor portion of the period between succeeding synchronizing pulses, and
        each said depressing pulse having a duration such that is terminates at a time immediately following each synchronizing pulse that is not greater than the maximum increase of oscillator period within a predetermined allowable tolerance.

4. The combination of claim 3 wherein said last mentioned means comprises
    means for capacitively coupling to the oscillator a train of depressing pulses of predetermined duration.

5. The combination of claim 3 wherein said train of depressing pulses is synchronized with said synchronizing pulses and has a duration such that each depressing pulse of said train continues for a time after the immediately preceding synchronizing pulse that is not greater than the maximum increase of period of the oscillator that is within a predetermined allowable tolerance,
    whereby the oscillator frequency will be maintained within said tolerance even in the absence of said synchronizing pulses.

6. The combination of claim 5 wherein the oscillator comprises a series connected resistor and capacitor and a switching device,
    said switching device having first and second input electrodes and an output electrode, and being connected to provide an output when signals at its input electrodes bear a predetermined relation to each other,
    said first input electrode being connected to the junction of said resistor and capacitor, and
    means for coupling said trains of synchronizing and depressing pulses to said second input electrode.

7. The combination of claim 6 wherein said means for coupling said train of depressing pulses to said second input electrode comprises
    a diode,
    a potential source, a resistor coupled between one side of the diode and one side of the potential source, a first transistor having a collector electrode resistively connected to the cathode of the diode, having an emitter electrode connected to the other side of the potential source, and having a base electrode, a Zener diode having one side thereof connected to said base electrode, a coupling capacitor having one side thereof connected to the other side of the Zener diode and having the other side thereof adapted to receive said train of depressing pulses, and a second coupling capacitor connected between the other side of the first mentioned diode and the second input electrode of said switching device.

8. The combination of claim 7 wherein said means for coupling said train of synchronizing pulses includes said first mentioned diode and said second coupling capacitor, and further includes a second transistor having a collector electrode resistively coupled to said one side of said first mentioned diode, having an emitter electrode connected to said other side of said potential source, and having a base electrode, a second Zener diode having one side thereof connected to the base of the second transistor, and a third coupling capacitor having one side thereof connected to the other side of said second Zener diode and the other side thereof connected to receive said train of synchronizing pulses.

9. A power supply comprising a source of AC power, an inverter, a source of DC power for the inverter, an oscillator for supplying trigger signals to the inverter and having a frequency substantially similar to the frequency of the AC source, means for synchronizing the oscillator from the AC source, means for momentarily depressing the frequency of the oscillator just before each synchronization thereof, and means for blocking flow of DC current to and from the oscillator and either of said AC source and said inverter, said means for momentarily depressing frequency comprising means for applying to the oscillator a train of frequency depressing pulses, each of said depressing pulses being initiated prior to synchronization of the oscillator from the AC source and terminating after a time interval following the synchronization of the oscillator that is substantially equal to the maximum increase of period of the oscillator that is within a predetermined allowable tolerance.

10. The combination of claim 9 wherein the oscillator comprises a series connected resistor and capacitor and a switching device, said switching device having first and second input electrodes and an output electrode, and being connected to provide an output when signals at its input electrodes bear a predetermined relation to each other, said first input electrode being connected to the junction of said resistor and capacitor, and said means for momentarily depressing the frequency of the oscillator comprising a first delay device having a triggering input from said AC source, a second delay device having a triggering input from the first delay device and providing a frequency depressing output pulse, and a second switching device capacitively coupled to the said second input electrode and having an input capacitively coupled to the depressing output pulses from said second delay device.

11. The combination of claim 10 including a pulse forming network responsive to and synchronized from said AC source, said means for synchronizing the oscillator comprising a third switching device capacitively connected to said second input electrode of the first mentioned switching device and having an input capacitively coupled to said pulse forming network, said first mentioned delay device having a triggering input from said pulse forming network.

12. The combination of claim 11 including a diode connected in common between said second input electrode of the first mentioned switching device and both of said second and third switching devices.

* * * * *

UNITED STATES PATENT OFFICE
CERTIFICATE OF CORRECTION

Patent No. 3,651,427          Dated March 21, 1972

Inventor(s) Paul E. Rolfes and Robert S. Jamieson

It is certified that error appears in the above-identified patent and that said Letters Patent are hereby corrected as shown below:

Claim 3, line 15, change "is" to --it--.

Signed and sealed this 19th day of September 1972.

(SEAL)
Attest:

EDWARD M. FLETCHER, JR.
Attesting Officer

ROBERT GOTTSCHALK
Commissioner of Patents